United States Patent
Amateau

[19]

[11] Patent Number: 5,855,997
[45] Date of Patent: Jan. 5, 1999

[54] LAMINATED CERAMIC CUTTING TOOL

[75] Inventor: Maurice F. Amateau, State College, Pa.

[73] Assignee: The Penn State Research Foundation, University Park, Pa.

[21] Appl. No.: 601,387

[22] Filed: Feb. 14, 1996

[51] Int. Cl.$^6$ ................................................ C04B 35/52
[52] U.S. Cl. .......................... 428/212; 51/307; 51/309; 428/323; 428/332; 428/697; 428/698; 428/699; 428/701; 428/702; 428/378; 428/379; 428/293.4; 428/293.7
[58] Field of Search ................................. 428/698, 701, 428/702, 697, 699, 332, 323, 212, 368, 293.4, 293.7, 378, 379; 51/307, 309

[56] References Cited

U.S. PATENT DOCUMENTS

| | | | |
|---|---|---|---|
| 4,789,277 | 12/1988 | Rhodes et al. | 409/131 |
| 4,852,999 | 8/1989 | Mehrotra et al. | 51/309 |
| 4,961,757 | 10/1990 | Rhodes et al. | 51/309 |
| 4,992,318 | 2/1991 | Gadkaree | 428/698 |
| 5,123,935 | 6/1992 | Kanamaru et al. | 51/309 |
| 5,346,517 | 9/1994 | Collin | 51/309 |

OTHER PUBLICATIONS

Amateau and Messing. "Laminates, Ceramic", *International Encyclopedia of Composites*, vol. 3, New York, 1990, pp. 11–17.
Amateau, "Laminated Ceramic Cutting Tool", Energy–Related Inventions Program Recommendation No. 672, *National Institute of Standards and Technology* Evaluation Report, Sep. 18, 1995.
Amateau, "Properties of Laminated Ceramic Composites", presented at Thirty–Seventh Sagamore Army Materials Research Conference, held Oct. 1–4, 1990, pp. 327–338.
T. Kim et al., "Residual Stresses in SiC Whisker/Mullite Laminated Composites", *Ceramic Transactions*, vol. 19, American Ceramic Society, 1991, pp. 677–693.
M. Wu et al., "Laminate Processing and Properties of Oriented SiC Whisker–Reinforced Composites", *Ceramic Transactions*, vol. 19, American Ceramic Society, 1991, pp. 665–676.
E.D. Kragness et al., "Processing and Characterization of Laminated SiC Whisker Reinforced $Al_2O_3$", *Journal of Composite Materials*, vol. 25, Apr. 1991, pp. 416–432.

*Primary Examiner*—A. A. Turner
*Attorney, Agent, or Firm*—Thomas J. Monahan

[57] ABSTRACT

A reinforced, laminated ceramic cutting tool has a core layer and at least two outer layers. The core layer and the outer layers, either alone or in combination, contain a reinforcement consisting of reinforcement particles, reinforcement whiskers or reinforcement platelets. When whiskers are used, the bulk of the whiskers are arranged so that a longitudinal dimension of each whisker is aligned substantially perpendicular to a flank face on the cutting tool. Likewise, when reinforcement platelets are used, the bulk of the platelets are oriented so that a basal plane of each platelet is in a plane substantially perpendicular to the flank face. Each outer layer has residual stresses in directions perpendicular to and parallel to the flank face, and each outer layer has the same thickness, composition and residual stresses as the other outer layer. Processes for making a laminated ceramic cutting tool, and products of those processes, are also disclosed.

25 Claims, 4 Drawing Sheets

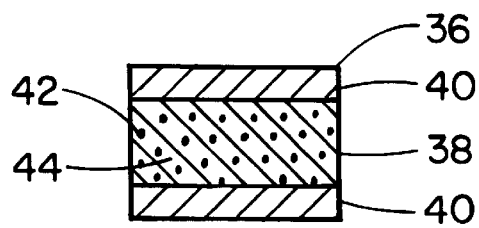
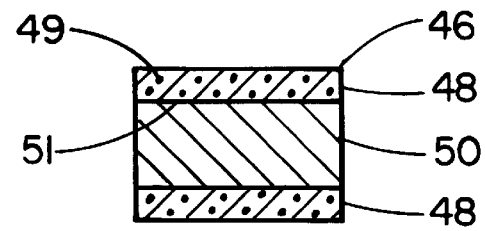
FIG.3　　　　　　　　FIG.4
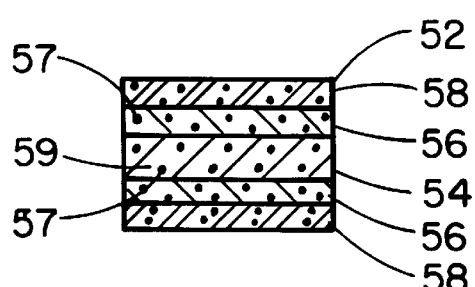
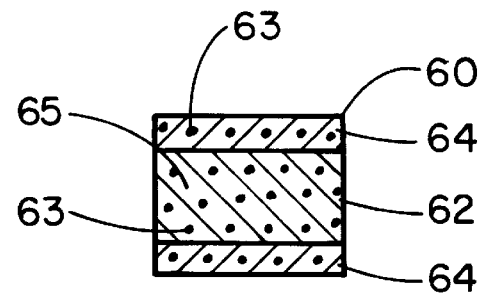
FIG.5　　　　　　　　FIG.6
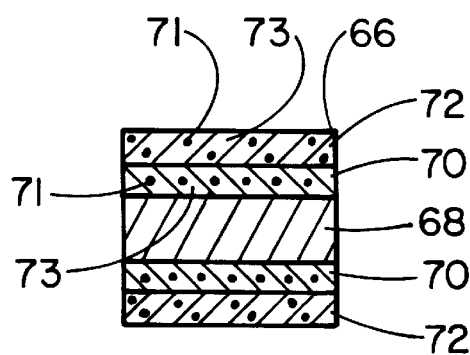
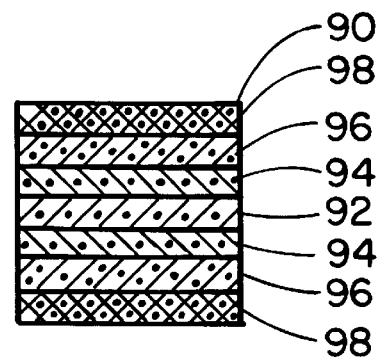
FIG.7　　　　　　　　FIG.8

LAMINATED CERAMIC CUTTING TOOL

BACKGROUND OF THE INVENTION

A. Field of the Invention

This invention is related to cutting tools for machining operations and, more particularly, a method and composition for laminated ceramic cutting tools.

B. Description of the Prior Art

Metal cutting or "machining" is a widely used process in manufacturing. Among the common machining operations are shaping, planing, milling, facing, broaching, grinding, sawing, turning, boring, drilling, and reaming. Some of these processes, such as sawing, operate on both the external and internal surfaces of the workpiece, while others operate only on the internal (for example, reaming) or external (for example, milling) surfaces of the workpiece.

A wide variety of materials have been used or suggested as cutting tools, such as tool steels, high-speed steels, cast non-ferrous alloys, sintered carbides, diamonds and ceramics. The commonly measured parameters of cutting tool performance are cutting speed, depth of cut, feed rate, and tool life. Each of the prior art cutting tool materials is deficient in one or more of these parameters. Cutting tools made from tool steel, high-speed steel and cast non-ferrous alloys all have critical temperature limitations which restrict their cutting speed to relatively low rates, as measured in feet per minute (fpm). Typically, high-speed steels are restricted to 100–225 fpm for cutting steel and 250–300 fpm for cutting non-ferrous materials. The cast non-ferrous alloys will operate at up to about twice those rates. The carbide materials, such as tungsten carbide, improve on the cutting speed rates of the steels by a factor of 2–5, particularly when the carbides are coated. However, the carbides are not as tough as the steels and are susceptible to impact breakage. This severely limits their usage in applications where impact is a factor, such as in making interrupted cuts or in machining hard workpieces.

Ceramic cutting tools were first used around 1905 and have been gaining increasing acceptance in the United States since the 1950's. Ceramic materials, such as aluminum oxide ($Al_2O_3$), also known as "alumina", have been found to produce cutting tools which can operate at much higher speeds than the conventional steel and carbide cutting tools. There has been a trend to substitute ceramic-based cutting tools for metal cutting tools in the machine tool industry. Ceramic and ceramic composite compositions most often used for cutting tool applications include alumina, silicon nitride ($Si_3N_4$), silicon nitride based ceramics in which aluminum is partially substituted for silicon and oxygen is partially substituted for nitrogen (the so-called "sialons") and aluminum oxide composite with titanium carbide ($Al_2O_3$/TiC).

Ceramics possess many but not all of the desirable properties required for cutting tools and have some of the characteristics necessary to counteract the principal causes of wear on cutting tools. The principal advantages of ceramic cutting tools are hardness, stiffness, high temperature strength, and chemical stability at elevated temperatures. Chemical stability is particularly important in minimizing the creation of craters on the top surface of the cutting tool, known as the rake face. High temperature strength is desirable during extended cutting operations. The main limitations of ceramics for cutting tools is their low tensile strength, low fracture toughness, and low impact resistance and thermal shock resistance. These property limitations make ceramic cutting tools of the prior art prone to premature failure by chipping, cracking or edge failure.

Reinforced ceramic cutting tools have recently been developed to improve on the cutting speed and life of the ceramic cutting tool. U.S. Pat. No. 4,961,757 to Rhodes et al. describes a reinforced ceramic cutting tool wherein the tool is comprised of a ceramic matrix reinforced by ceramic whiskers. The ceramic matrix is alumina or silicon nitride, and the whiskers are preferably silicon carbide. In tools according to the Rhodes et al. patent, silicon carbide whiskers are directly blended with the ceramic matrix and the mixture is hot pressed into cutting tools. A problem with this method and composition for ceramic cutting tools is that it provides very little control over the distribution and orientation of the reinforcements in the final tool body. The reinforcements are present throughout the entire thickness of the tool, and they have a substantially random orientation in the plane normal to the pressing direction and a partially random orientation in the through-thickness direction.

Another significant limitation to the method and composition of the reinforced ceramic cutting tools set forth in Rhodes et al. is the cost of reinforcements such as silicon carbide whiskers. Whiskers cost ten times that of the common matrix materials (for example, aluminum oxide). Hence, cost-effective manufacturing methods and material designs that make efficient use of the reinforcements, their distribution and orientation, are required. Cutting tools purportedly pursuant to the Rhodes et al. patent are commercially available under the designation "WG-300", as marketed by Greenleaf Corp., Saegertown, Pa.

The inventor has published articles generally discussing the properties of laminated ceramic composites and the reinforcement of these composites. See Amateau, "Properties of Laminated Ceramic Composites", record of proceedings for the 37th Sagamore Army Materials Research Conference, held Oct. 1–4, 1990, pp. 327–338; Kragness, Amateau and Messing, "Processing and Characterization of Laminated SiC Whisker Reinforced $Al_2O_3$", *Journal of Composite Materials*, Vol. 25, p. 416 (April 1991); Kim, Amateau and Messing, "Residual Stresses in SiC Whisker-Mullite Laminated Composites", *Ceramic Transactions*, Vol. 19, p. 677 (1991); and Wu, Messing and Amateau, "Laminate Processing and Properties of Oriented SiC Whisker-Reinforced Composites", *Ceramic Transactions*, Vol. 19, p. 665 (1991). However, none of these publications teaches or suggests the use of reinforced laminated ceramic composites for cutting tool applications.

As recognized at column 3, lines 35–40 of the Rhodes et al. patent, the critical and unique combination of operating stress, temperature and impact makes the determination of materials suitable for use as cutting tools significantly different from the determination of materials for other industrial articles, such as heat exchangers, gears, refractories, heat engines and armor.

Finally, in Amateau and Messing, "Laminates, Ceramic", *International Encyclopedia of Composites*, Vol. 3, VCH, New York, pp. 11–16 (1990), the inventor pointed out that ceramic composites have been used in cutting tool bits and stated that laminated composite designs would permit economical use of the high-cost reinforcement phases as well as improving fracture strength and impact resistance. However, this article made no mention of any particular designs or processes for making laminated ceramic cutting tools. The inventor is aware of no specific teaching or suggestion in the literature of the art, or in commercial applications, for using a laminated, reinforced ceramic, wherein the thickness, composition and arrangement of the lamina and the orientation of the reinforcements is controlled to maximize the use of the expensive reinforcement materials and to improve properties which are important to cutting tools. The marked improvement in cutting tool performance realized when using properly reinforced laminated ceramic cutting tools, in light of the dearth of information in the literature or in practical applications in this regard, indicates that it would not have been obvious to one of ordinary skill in the art to utilize the method and device for laminated ceramic tools as hereinbelow described and claimed.

Therefore, it is an object of the present invention to provide a reinforced laminated ceramic cutting tool and a method of manufacturing the same wherein the distribution and orientation of reinforcements in the tool body is controlled so that the cost of the reinforcements is minimized while the enhancement of the properties of the cutting tool is maximized. It is a further object to provide a laminated ceramic cutting tool wherein the thickness, composition and arrangement of the lamina are selected to improve properties which are important to cutting tools. It is a still further object to increase tensile strength, fracture toughness, impact resistance and thermal shock resistance, as well as resistance to chemical wear, for ceramic cutting tools. Finally, it is an object to provide a method and device for laminated ceramic cutting tools wherein the tool exhibits greatly reduced wear per unit time when compared to prior art reinforced ceramic composite cutting tools.

SUMMARY OF THE INVENTION

Accordingly, I have invented a reinforced, laminated ceramic cutting tool having a flank face and further having a core layer, at least two outer layers and a reinforcement selected from one or more of the group consisting of reinforcement particles, reinforcement whiskers oriented so that a longitudinal dimension of most of the whiskers is aligned substantially perpendicular to the flank face, and reinforcement platelets oriented so that a basal plane of most of the platelets is in a plane substantially perpendicular to the flank face. The at least two outer layers are symmetrically arranged about the core layer and spaced from one another along an axis which is perpendicular to the core layer. In other words, one outer layer may be above the core layer and the other below. The reinforcement is arranged so that it is present in the core layer only, present in the core layer and the outer layers, or present in the outer layers and not present in the core layer. Each outer layer has a first residual stress in a direction perpendicular to the flank face and a second residual stress parallel to the flank face, and each outer layer has the same thickness, composition, and residual stresses as the other outer layer. The residual stresses may be compressive, neutral or tensile in the outer layers. Compressive residual stresses have been found particularly advantageous in increasing the apparent plane-strain fracture toughness of the cutting tool.

Each of the core layer and the outer layers may be made by tape casting or, alternatively, the core layer may be made by a method other than tape casting, such as by dry powder pressed between tape-cast outer layers.

The composition of the core layer can be alumina, silicon carbide, silicon nitride, titanium carbide, titanium nitride, cemented tungsten carbide or boron carbide. The reinforcement composition can be either silicon carbide, titanium carbide, silicon nitride or titanium nitride.

The cutting tool may further include a slightly reinforced or unreinforced layer of alumina or mullite on an outward side of each of the outer layers.

I have also invented a process for manufacturing a laminated ceramic cutting tool, including the steps of:

(a) preparing a slurry comprising a matrix powder and a reinforcement;

(b) depositing the slurry on a carrier film using a spreading blade to form a tape, the carrier film moving relative to the spreading blade in a casting direction;

(c) drying the tape;

(d) cutting the tape into sections of predetermined shape and dimensions;

(e) removing the carrier film from the tape;

(f) stacking the tape sections in a die so that a casting direction for each section is parallel to the casting direction of its adjacent sections; and (g) pressing the tape sections in the die under conditions of elevated temperature and pressure.

The process may also include, prior to pressing in step (g), the step of pressing the tape sections in the die with a hydraulic press for the purpose of prelaminating the stacked tape sections. The process may further include the step of finish grinding after pressing in step (g).

A variation of step (f) includes inserting a dry powder in the die above a first portion of the tape sections and inserting a second portion of the tape sections, equal to the first portion, into the die above the dry powder to form a symmetric sandwich arrangement. This variation is preferred when the core layer, which is formed by the dry powder, is to be of a thickness of 0.15 inches or more in the finished tool.

Finally, my invention includes laminated ceramic cutting tools made according to the process above and certain of its variant forms.

BRIEF DESCRIPTION OF THE DRAWINGS

FIG. 3 is a cross-sectional view of a cutting tool, showing a first cutting tool design according to the present invention;

FIG. 4 is a cross-sectional view of a cutting tool, showing a second cutting tool design according to the present invention;

FIG. 5 is a cross-sectional view of a cutting tool, showing a third cutting tool design according to the present invention;

FIG. 6 is a cross-sectional view of a cutting tool showing a fourth cutting tool design according to the present invention;

FIG. 7 is a cross-sectional view of a cutting tool showing a fifth cutting tool design according to the present invention;

FIG. 8 is a cross-sectional view of a cutting tool showing a sixth cutting tool design according to the present invention;

DETAILED DESCRIPTION OF THE PREFERRED EMBODIMENTS

Figure 1:
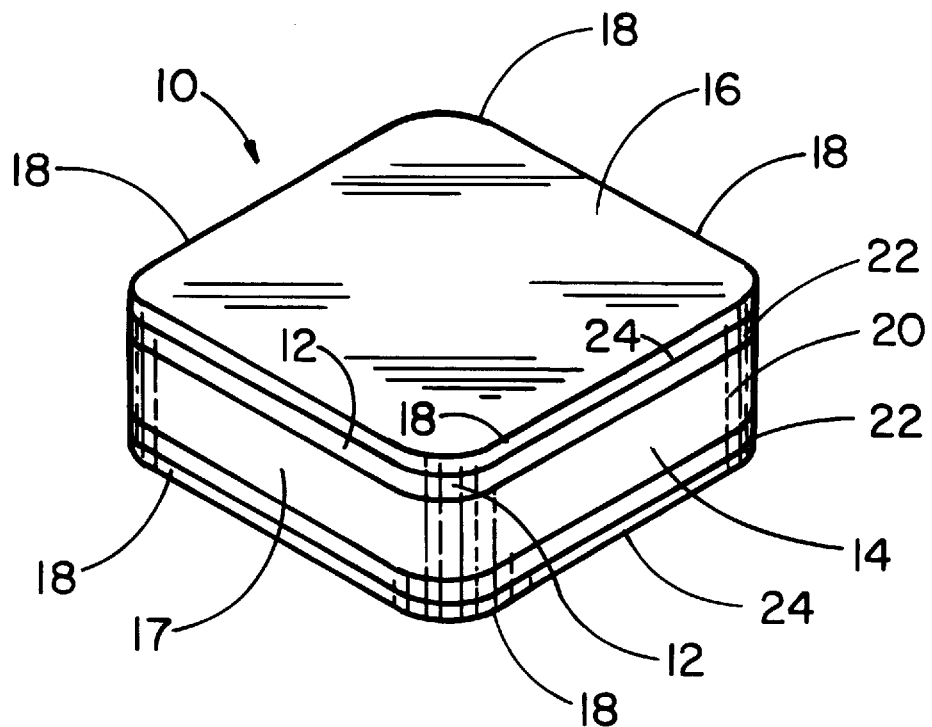
FIG. 1 is a schematic perspective view of a laminated ceramic cutting tool according to the present invention.

FIG. 1 is a schematic perspective view of a typical laminated ceramic cutting tool 10 according to the present invention. Ceramic cutting tool 10 has a nose 12, a flank face 14, a rake face 16 and a clearance face 17. The cutting tool 10 is typically formed in the shape shown in FIG. 1; however, the tool may be ground, molded or die-punched in irregular shapes for specific applications.

The cutting tool 10 has a cutting edge 18 which is typically pre-beveled by grinding the edge 18 around the upper and lower perimeters of the cutting tool 10. The bevel, known as an "edge prep", is not shown in the drawing. The cutting tool of FIG. 1 may be rotated and flipped during use so that it effectively has eight cutting edges 18.

Cutting tool 10 has a core layer 20, two first outer layers 22 and two second outer layers 24. Second outer layers 24 may also be referred to as "flank wear layers". Laminated ceramic cutting tools according to the present invention may contain more or less layers than those shown in FIG. 1. Generally, the laminated ceramic cutting tools of the present invention utilize unique arrangements, thicknesses and compositions of a core layer and various outer layers to maximize wear resistance and toughness and to minimize cost, as discussed in further detail below.

With the cutting tool 10 oriented as shown in FIG. 1, a workpiece (not shown), such as a steel billet turning on a lathe, would be arranged so that the longitudinal dimension of the workpiece extends roughly parallel to the flank face 14 of cutting tool 10. Rake face 16 would generally face vertically upward, and the point of contact between the workpiece and cutting tool 10 would generally be at or near the area of nose 12. When the cutting edge 18 at or near nose 12 reaches the point of unacceptable wear, the cutting tool 10 would then be rotated about its vertical axis or flipped to orient another corner of the cutting tool 10 in the nose position. This process is repeated until all cutting edges 18 of the cutting tool 10 are worn or the cutting tool fails for some reason, such as by chipping or cracking. It will be clear to those of ordinary skill in the art that the orientation of the cutting tool 10, the actual point of contact between the cutting tool and the workpiece, and the pattern of usage of the cutting tool will depend upon the particular cutting operation in which the cutting tool is utilized.

Figure 2:
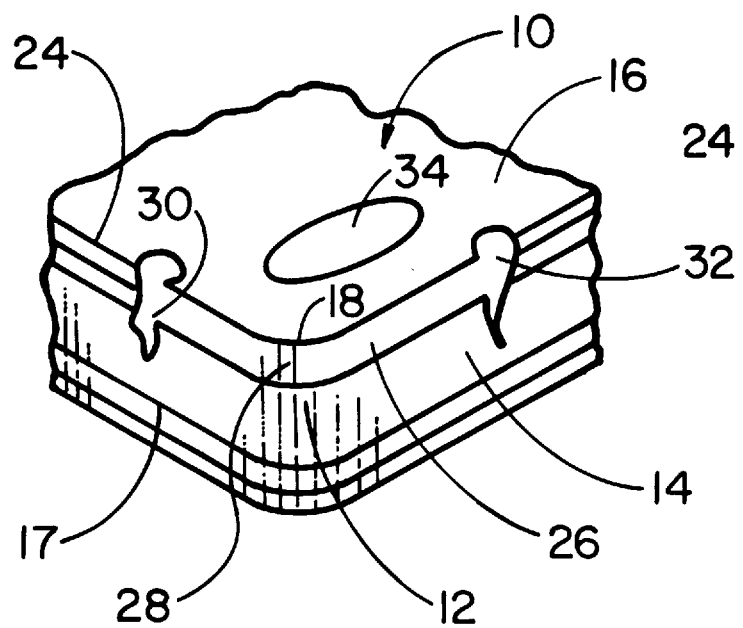
FIG. 2 is a perspective view of a cutting tool, partially broken away, indicating typical areas of wear on the cutting tool.

Cutting tools in general exhibit typical wear patterns related to the nature of contact between the tool and the workpiece. The principal regions of tool wear are shown in FIG. 2. Flank wear occurs in region 26 due to the friction and shearing action between the cutting edge 18 of the tool and the material being removed from the workpiece. Flank wear is essentially a continuation of the edge prep into the flank wear layer 24. Nose radius wear occurs in region 28 and is also a further deepening of the edge prep as a result of contact between the cutting edge 18 and the workpiece. Trailing edge notch wear occurs in region 30 of the clearance face 17 and is caused by chipping during sliding contact of the clearance face and the workpiece. The adhesive wear process in this region is a likely mechanism for the formation of the notch or groove which is characteristic of this type of wear. A similar type but larger notch or groove 32 is formed on the flank face 14 and usually corresponds to the depth that the cutting tool 10 has cut into the workpiece. A crater 34 forms on the rake face 16 of the cutting tool 10, and this is caused by the chips that are removed from the workpiece actually dissolving the material of the cutting tool 10. The deeper the crater 34, the greater the severity of this type of wear.

Cutting tools must have high hardness and stiffness to resist deformation under the high cutting forces exerted in machining operations. Intense cutting stresses are localized and concentrated at the cutting edge 18 of the cutting tool 10. The work required to deform the workpiece and generate the chip, as well as the friction between the chip and the face of the cutting tool, causes considerable heat to be generated in the cutting tool. The properties of the workpiece, such as its ductility or hardness, can further intensify the stresses and operating temperatures to which the cutting tool is subjected. The cutting tool is also subjected to various degrees of impact, particularly when making intermittent cuts and also depending on whether the workpiece tends to form continuous or discontinuous chips.

Cutting tools must possess high wear resistance to maintain sharp cutting edges to permit high machining accuracy over extended periods of time. Long cutting tool life also requires high tensile and compressive strength, fatigue resistance, high temperature strength, chemical inertness, high fracture toughness, impact resistance and high thermal shock resistance. Thus, the critical and unique combination of operating stress, temperature and impact makes the determination of materials suitable for use as cutting tools, and the composition and arrangement of those materials, significantly different from the determination of materials for other industrial articles.

The laminated ceramic cutting tool of the present invention utilizes a lamination process to construct the cutting tool so that discrete layers of reinforced materials are arranged to maximize wear resistance and toughness. It has also been found that particular placement of certain unreinforced ceramic layers can minimize costs, while maximizing wear resistance. For example, the placement of an unreinforced alumina or mullite layer on the outward surfaces of outer layers 24 of the cutting tool 10 would reduce crater wear by chemical reaction between the cutting tool and the chip. With the present invention, the concentration, orientation and distribution of the reinforcements, and the composition, thickness and arrangement of the lamina are controlled for optimized laminated cutting tool performance.

The laminated nature of the cutting tool according to the present invention is made possible by utilization of a tape casting process, wherein each layer of the tool may be of a discrete and unique composition, since each layer is cast separately in the form of a tape. The tape layers are then stacked in the desired order, laminated with heat and pressure, oxidized to remove an organic binder, and then densified by vacuum hot pressing.

The reinforcements of choice are silicon carbide whiskers or single crystal platelets. Silicon carbide or titanium carbide particles, which are less regular than the whiskers or platelets from a crystalline standpoint, may also be used. The reinforcements are typically in the range of from about 2% to about 45% of the layer in which they are present in the ceramic cutting tool, by volume. The use of the tape casting process provides that, when whiskers or platelets are used, substantially all of the whiskers are oriented with their longitudinal axes substantially perpendicular to the flank face 14. When using platelets, the platelets are oriented so that the basal plane of substantially all of the platelets is in a plane substantially perpendicular to the flank face 14.

Figure 9:
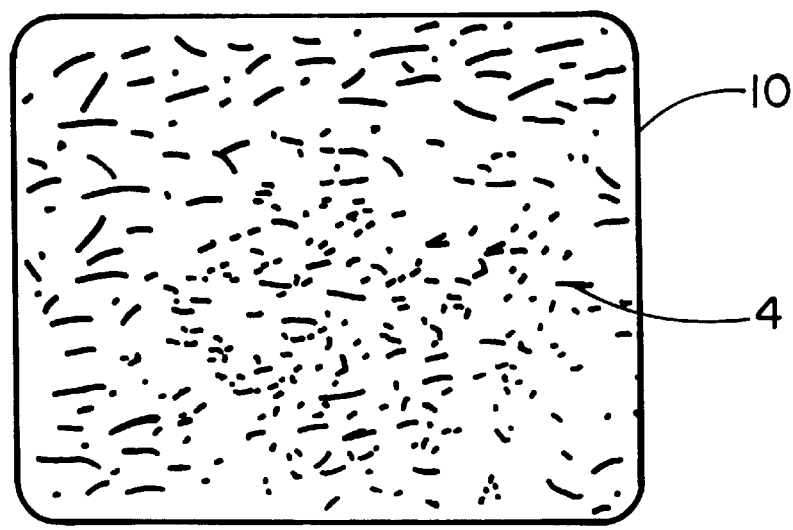
FIG. 9 is a schematic plan view showing reinforcement whisker alignment in the surface of a cutting tool made according to the present invention.
Figure 10:
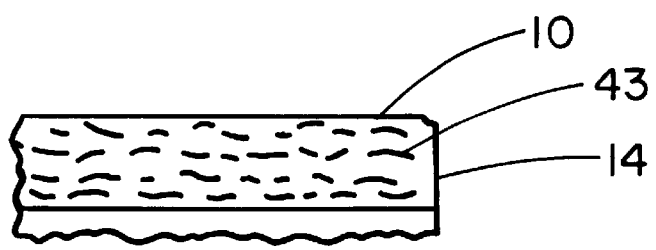
FIG. 10 is a schematic side view, partially broken away, of a cutting tool showing a preferred alignment of reinforcement platelets according to the present invention.

Sketches showing alignment of whisker reinforcements 42 or platelets 43, according to the present invention, are provided in FIGS. 9 and 10. This orientation of the whiskers and the platelets is used to minimize flank wear and chipping. By "substantially", it is meant that the bulk of the whiskers or platelets are aligned generally perpendicular to the flank face 14 but may deviate from this alignment a certain degree, as shown in FIGS. 9 and 10. A certain percentage of the whiskers or platelets may not be so aligned, but the improved properties of the cutting tool, such as reduced flank wear and improved toughness, will still be realized. It is not practically possible to achieve true perpendicular alignment of all whiskers or platelets, and this will be apparent to those skilled in the art upon reviewing the instant specification.

The sequencing of the layers in the laminated ceramic cutting tool is chosen to minimize large differences in residual stress between the layers and to avoid large tensile stresses at the outer edges of the cutting tool. This sequencing is done by a process known as thermoelastic tailoring. Another consideration in choosing the sequence of layers used is to ensure that a symmetrical layup will result so that out-of-plane bending moments across the thickness of the cutting tool, while it is in use, will be eliminated. By "symmetrical layup" it is meant that the arrangement and composition of layers both above and below the core layer is the same for a given cutting tool.

The core layer 22 of the cutting tool 10 is typically the thickest layer of the cutting tool and is composed of, for example, unreinforced or slightly reinforced aluminum oxide, to minimize material cost and to ensure the development of residual stresses in the outer layers.

Residual stresses are induced in the outer layers due to a differential thermal contraction between the outer layers and the core layer during cooling after vacuum hot pressing. The residual stresses improve the mechanical performance of the tools. For example, a measure of the plane-strain fracture toughness generated by thermoelastic tailoring has shown that tools without whisker reinforcement have a fracture toughness of around three MPa $\bullet$ m$^{1/2}$. Ceramic cutting tools with reinforcement whiskers exhibit a fracture toughness of 6–8 MPa $\bullet$ m$^{1/2}$. Thermoelastic tailoring, utilizing a differential in the coefficient of thermal expansion between the core layer and the outer layers, has produced a fracture toughness on the order of 10 MPa $\bullet$ m$^{1/2}$. This higher apparent fracture toughness for the thermoelastically tailored, laminated ceramic cutting tools is believed to be due to the compressive stresses induced on the outer layers of the cutting tool by differential contraction during cooling after vacuum hot pressing.

The design of laminated ceramic cutting tools depends on the material being cut and the machining conditions. Cutting tools used for interrupted cuts require high fracture toughness and impact resistance. Cutting tools that are reactive with workpiece materials are especially susceptible to cratering of the rake face 16. Thus, chemical inertness is an important characteristic when machining such materials. Difficult-to-machine metals, such as nickel-based alloys and hardened steel, require superior wear and abrasion resistance. Several laminated ceramic cutting tool designs have been developed to meet these specific requirements. Laminated, reinforced ceramic cutting tool designs according to the present invention are particularly suitable for machining nickel-based superalloys, such as Inconel 718, chilled cast iron, hardened steel and tool steels. Whisker-reinforced ceramic cutting tools may not be suitable for use with ferrous alloys, due to the elevated temperatures experienced when machining these alloys and the tendency of SiC whiskers to react with iron and dissolve.

FIG. 3 is a schematic cross-sectional view of a laminated ceramic cutting tool design which is directed to minimizing chemical reaction between the cutting tool material and the workpiece. Cutting tool 36, according to this first design, has a core layer 38 and two outer layers 40. The outer layers consist of an unreinforced oxide ceramic, such as aluminum oxide. The outer layers 40 can range in thickness from about 0.002 inch to about 0.025 inch. The purpose of the outer layers 40 is to minimize the reaction or solution between the metal chips generated from the workpiece and the cutting tool. This minimizes rake face crater wear.

Core layer 38 contains a reinforcement 42 in an aluminum oxide matrix 44. The reinforcement optimizes toughness, strength, thermal shock resistance and wear resistance for cutting tools according to this design. The reinforcement may be present in a concentration ranging from about 5% to about 45% by volume in core layer 38. The reinforcement may take the form of titanium carbide particles, silicon carbide whiskers or single crystal silicon carbide platelets. Two preferred designs, designated GX-06 and GX-08, incorporate 26% titanium carbide particles as the reinforcement 42 in core layer 38. The GX-06 and GX-08 designs have been built and tested by the inventor, as discussed below. When whiskers or platelets are used, they are oriented as discussed above.

The thickness, arrangement and composition of layers 38 and 40 is selected to minimize large differences in residual stress between them and especially to avoid large tensile stresses at the outer edges of the cutting tool 36. This process, called thermoelastic tailoring, is done using known principles of material mechanics. Note that cutting tool 36 has a symmetrical lay-up, as discussed above.

Table I, below, shows the composition and residual stress patterns for designs GX-06 and GX-08. Designs GX-06 and GX-08 are identical in composition, but the thicknesses of layers 38 and 40 are varied. Note that in designs GX-06 and GX-08, the residual stresses in outer layers 40 are not compressive but are tensile. The residual stresses, parallel to and perpendicular to the flank face 14, are determined by classical laminate plate theory, as more fully discussed in Kim, Amateau and Messing, "Residual Stresses in SiC Whisker-Mullite Laminated Composites", *Ceramic Transactions*, Vol. 19, p. 677 (1991), incorporated herein by reference. In Tables I–VI, below, compressive residual stresses are indicated as negative, and tensile residual stresses are indicated as positive.

TABLE I

Designs Nos. GX-06 and GX-08

| Design No. | Layer No. | Layer Thickness, inch | Composition | Residual Stress Perpendicular to the Flank Face, psi | Residual Stress Parallel to the Flank Face, psi |
| --- | --- | --- | --- | --- | --- |
| GX-06 | 40 | 0.0250 | Alumina | 5,800 | 5,800 |
|  | 38 | 0.1375 | 26% TiCP/ Alumina | −2,100 | −2,100 |
|  | 40 | 0.0250 | Alumina | 5,800 | 5,800 |
| GX-08 | 40 | 0.0100 | Alumina | 7,100 | 7,100 |
|  | 38 | 0.1675 | 26% TiCP/ Alumina | −840 | −840 |
|  | 40 | 0.0100 | Alumina | 7,100 | 7,100 |

FIG. 4 shows another cutting tool 46 according to a second general cutting tool design which is specifically intended to improve cutting tool toughness. This design has been designated GX-20. Outer layers 48 consist of reinforced oxide ceramic, such as aluminum oxide. The reinforcements can be silicon carbide whiskers, titanium carbide whiskers, titanium carbide particles, silicon nitride whiskers, silicon nitride particles, or titanium nitride particles. Outer layers 48 can range from about 0.005 inch to about 0.010 inch thick. The purpose of the outer layers 48 is to provide a higher toughness layer with a compressive residual stress.

Core layer 50 is selected to be wear resistant and thermoelastically compatible with outer layers 48. Core layer 50 is an unreinforced alumina layer approximately 0.1675 inch thick. Outer layers 48 preferably contain 26% by volume titanium carbide particulate reinforcements 49 in an alumina matrix 51. Again, the reinforcement can range from about 2% to about 45% by volume. The alumina core 50 is selected for high wear resistance at a relatively low cost. Table II, below, shows the details of the thicknesses of layers 48 and 50, the composition of each layer and the residual stresses in these layers for the cutting tool 46.

TABLE II

Design No. GX20

| Bonded Layers | Layer Thickness, inch | Composition | Residual Stress Perpendicular to the Flank Face, psi | Residual Stress Parallel to the Flank Face, psi |
| --- | --- | --- | --- | --- |
| 48 | 0.0100 | 26% TiCp/Alumina | −7,200 | −6,500 |
| 50 | 0.1675 | Alumina | 860 | 780 |
| 48 | 0.0100 | 26% TiCP/Alumina | −7,200 | −6,500 |

FIG. 5 shows still another cutting tool 52, also designed for improved toughness. This design is designated DX-13. Cutting tool 52 has a core layer 54, first outer layers 56 and second outer layers 58. Core layer 54 is reinforced with about 5% by volume silicon carbide whiskers 57 in an alumina matrix 59 and is 0.1575 inch thick. First outer layers 56 are reinforced with about 20% by volume silicon carbide whiskers and are about 0.01 inch thick. Second outer layers 58 are reinforced with about 10% silicon carbide whiskers and are about 0.005 inch thick. All layers 54, 56 and 58 have an alumina matrix 59. The design of the cutting tool 52 utilizes silicon carbide whisker reinforced alumina layers to provide a combination of whisker toughening and compressive residual stresses. Table III, below, details the layer thicknesses, compositions, and residual stresses for the cutting tool design according to cutting tool 52. The principal toughening mechanism in this design is the compressive residual stresses on the outer layers 58 of the tool 52.

TABLE III

Design No. DX-13

| Bonded Layers | Layer Thickness, inch | Composition | Residual Stress Perpendicular to the Flank Face, psi | Residual Stress Parallel to the Flank Face, psi |
| --- | --- | --- | --- | --- |
| 58 | 0.0050 | 10% SiC$_w$/Alumina | −9,600 | −8,600 |
| 56 | 0.0100 | 20% SiC$_w$/Alumina | −3,900 | −3,400 |
| 54 | 0.1575 | 5% SiC$_w$/Alumina | 5,600 | 4,900 |
| 56 | 0.0100 | 20% SiC$_w$/Alumina | −3,900 | −3,400 |
| 58 | 0.0050 | 10% SiC$_w$/Alumina | −9,600 | −8,600 |

FIG. 6 shows still another design adapted for very high toughness applications. Cutting tool 60 has a core layer 62 and two outer layers 64. The core layer is 10% reinforced with silicon carbide whiskers 63 and is approximately 0.1675 inch thick. The outer layers are 20% reinforced with silicon carbide whiskers and are approximately 0.01 inch thick. The matrix 65 for each of the core layer and the outer layers is a 17% Si$_3$N$_4$-alumina composite. The reinforcements can alternatively be titanium carbide whiskers or silicon nitride whiskers. Outer layers 64 can range in thickness from 0.005 inch to 0.01 inch. The purpose of the outer layer 64 is to provide a higher toughness layer with a compressive residual stress.

The core layer 62 is selected to be wear resistant and thermoelastically compatible with outer layers 64. The core layer 62 can consist of lower volume fractions of the reinforcement, to minimize costs. Preferable reinforcement concentrations in the core layer 62 will range from a trace to about 10% by volume.

FIG. 7 shows another high toughness application design. Tool 66 has a core layer 68 which is unreinforced and is a mixed oxide-nitride ceramic, such as 17% silicon nitride in aluminum oxide. First outer layers 70 contain 10% by volume silicon carbide whisker reinforcements 71 in a mixed nitride-oxide ceramic matrix 73. Second outer layers 72 contain 20% silicon carbide whisker reinforcement 71 in a mixed nitride-oxide ceramic matrix 73. The design shown in cutting tool 66 uses a core layer 68 which has no reinforcement, thereby achieving thermoelastic compatibility, wear resistance and toughness, while minimizing costs.

Thicknesses, compositions and residual stresses for designs according to FIGS. 6 and 7 are shown in Tables IV and V, respectively.

TABLE IV

Cutting Tool 60

| Bonded Layers | Layer Thickness, inch | Composition | Residual Stress Perpendicular to the Flank Face, psi | Residual Stress Parallel to the Flank Face, psi |
| --- | --- | --- | --- | --- |
| 64 | 0.0100 | 20% SiC$_w$/17% Si$_3$N$_4$-Alumina | −20,100 | −17,400 |
| 62 | 0.1675 | 10% SiC$_w$/17% Si$_3$N$_4$-Alumina | 2,400 | 2,100 |
| 64 | 0.0100 | 20% SiC$_w$/Si$_3$N$_4$-Alumina | −20,100 | −17,400 |

TABLE V

Cutting Tool 60

| Bonded Layers | Layer Thickness, inch | Composition | Residual Stress Perpendicular to the Flank Face, psi | Residual Stress Parallel to the Flank Face, psi |
| --- | --- | --- | --- | --- |
| 72 | 0.0050 | 20% SiC$_w$/17% Si$_3$N$_4$-Alumina | −39,200 | −32,700 |
| 70 | 0.0100 | 10% SiC$_w$/17% Si$_3$N$_4$-Alumina | −15,700 | −13,000 |
| 68 | 0.1575 | 17% Si$_3$N$_4$-Alumina | 5,100 | 4,300 |
| 70 | 0.0100 | 10% SiC$_w$/17% Si$_3$N$_4$-Alumina | −15,700 | −13,000 |
| 72 | 0.0050 | 20% SiC$_w$/17% Si$_3$N$_4$-Alumina | −39,200 | −32,700 |

FIG. 8 shows another cutting tool 90, designated DX-14, which utilizes a greater number of lamina and which is designed to minimize the carbide content of the outer surface, while still resulting in surface compressive residual stresses. Core layer 92 in tool 90 includes 5% by volume reinforcement of silicon carbide whiskers in an alumina matrix. First outer layers 94 include 10% silicon carbide whisker reinforcement, second outer layers 96 include 20% silicon carbide whisker reinforcement, and third outer layers 98 include 10% silicon carbide whisker reinforcement. All outer layers utilize alumina as the matrix material. Thicknesses, composition and residual stress data for the DX-14 design are set forth in Table VI, below.

TABLE VI

DX-14

| | Composition | Thickness (inch) | Residual stress perpendicular to the flank face (psi) | Residual stress parallel to the flank face (psi) |
|---|---|---|---|---|
| 98 | 10 $SiC_w$-$Al_2O_3$ | .005 | −4,933 | −1,741 |
| 96 | 20 $SiC_w$-$Al_2O_3$ | .0075 | −38,010 | −38,736 |
| 94 | 10 $SiC_w$-$Al_2O_3$ | .0075 | −4,933 | −1,741 |
| 92 | 5 $SiC_w$-$Al_2O_3$ | .1476 | 18,425 | 16,974 |
| 94 | 10 $SiC_w$-$Al_2O_3$ | .0075 | −4,933 | −1,741 |
| 96 | 20 $SiC_w$-$Al_2O_3$ | .0075 | −38,010 | −38,736 |
| 98 | 10 $SiC_w$-$Al_2O_3$ | .005 | −4,933 | − 1,741 |

Process for Making Laminated Ceramic Cutting Tools

The following process methods are preferred to make the material designs for reinforced laminated ceramic cutting tools, as described above. Generally, individual layers that are to be used to make up the cutting tool are tape cast using modified methods heretofore used to make multi-layer electronic ceramic components. The principal modification is the incorporation of silicon carbide whiskers, titanium carbide whiskers, silicon nitride whiskers, titanium carbide particles or silicon nitride particles into the matrix ceramic.

Figure 11:
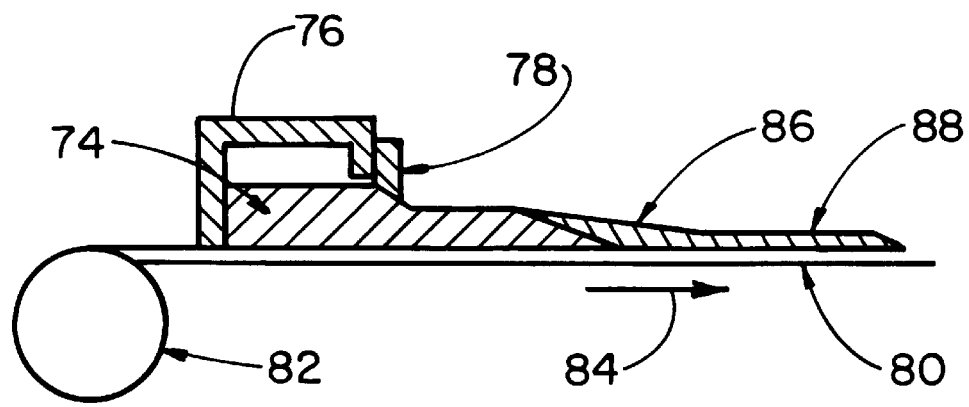
FIG. 11 is a schematic view of a tape casting process for making laminated ceramic cutting tools according to the present invention.

Referring to FIG. 11, a schematic of the tape casting process is shown. A slurry 74 is contained in a reservoir 76. The degree of opening of the reservoir 76 is controlled by a spreading blade 78, also known as a "doctor blade". When the spreading blade 78 is opened, the slurry 74 is introduced onto a carrier film 80. The carrier film may be maintained on a storage roll 82. The carrier film 80 is commercially available and is generally made from polypropylene. The carrier film 80 is conveyed beneath the spreading blade 78 and reservoir 76 in a casting direction 84. The slurry is carried from the point of the spreading blade 78 to a drying zone 86, and eventually a dried green tape 88 forms on top of the carrier film 80, from the slurry.

A suitable tape casting machine to produce reinforced laminated ceramic cutting tools according to the present invention is the TAM model 104. The tape 88, after casting, is flexible and can be easily stripped from the carrier film 80 for stacking prior to laminating. The tape casting process allows for discrete and unique compositions for different layers of the cutting tool, each cast into a separate tape.

When whiskers or platelets are used as reinforcements for the laminated ceramic cutting tool, the whiskers and platelets orient themselves due to the action of the spreading blade 78 in combination with the moving carrier film 80. When the spreading blade 78 is feeding the slurry or "slip" 74 onto the carrier film 80, the greater the feed rate onto the film, the greater the orientation effect of the spreading blade 78 on the whiskers. The whiskers and the platelets are generally oriented longitudinally along the direction of the film, i.e., along the casting direction 84. FIGS. 9 and 10 show schematically the orientation of whisker and platelet reinforcements in a tape cast layer according to the present invention.

Suitable suppliers for materials according to the present invention are as follows:

1. For silicon carbide whiskers, the product provided by Advanced Composite Materials Corp. of Greenville, S.C. has been found suitable;
2. For monocrystalline silicon carbide platelets, the product provided by Advanced Refractory Technology of Buffalo, N.Y. is suitable; and
3. For alumina, used as the matrix material for most of the preferred designs according to the invention, grade RC-HPBM (Reynolds Aluminum Corp.) containing 0.05% MgO with a particle size of 34 μm is suitable.

Suitable alternative matrices for cutting tools according to the present invention, in addition to alumina, would include mullite, silicon nitride, titanium carbide, cemented tungsten carbide and boron carbide.

The slurry or "slip" preferably consists of ceramic powders, an organic polymer, a plasticizer, a dispersant and a solvent. Particularly, the organic polymer and the dispersant may be part of a commercial acrylic resin binder system, such as DuPont's 5200 MLC, consisting of 62 weight percent poly (ethyl methacrylate), 37 weight percent poly (methyl acrylate), and 1 weight percent poly (methylacrylic acid). The polymer is supplied by the manufacturer as a 30 weight percent solution in methyl ethyl ketone (MEK). The solvent is 1, 1, 1 trichloroethane (TCE), and the plasticizer is butyl benzyl phthalate.

Table VII below shows typical slip formulations for a laminated ceramic cutting tool utilizing silicon carbide whisker reinforcements in an alumina ($Al_2O_3$) matrix.

TABLE VII

Slip Formulations for Sic Whisker/Alumina Composites

| Composition (Vol % Whiskers) | Constituent Volume Fraction (%) | | | | | |
|---|---|---|---|---|---|---|
| | $Al_2O_3$ | $SiC_w$ | Polymer | Plasticizer | MEK | TCE |
| 0 | 23.6 | 0.0 | 11.9 | 2.5 | 31.8 | 30.2 |
| 10 | 20.2 | 2.2 | 10.5 | 3.3 | 28.1 | 35.7 |
| 20 | 17.2 | 4.3 | 9.3 | 3.9 | 25.0 | 40.3 |

Additional slip formulations are possible without departing from the scope of the present invention. For instance, specimen fabrications are set forth in Amateau et al., "Performance of Laminated Ceramic Composite Cutting Tools", *Ceramics International*, Vol. 21, pp. 317–323 (1995), incorporated herein by reference.

Figure 12:
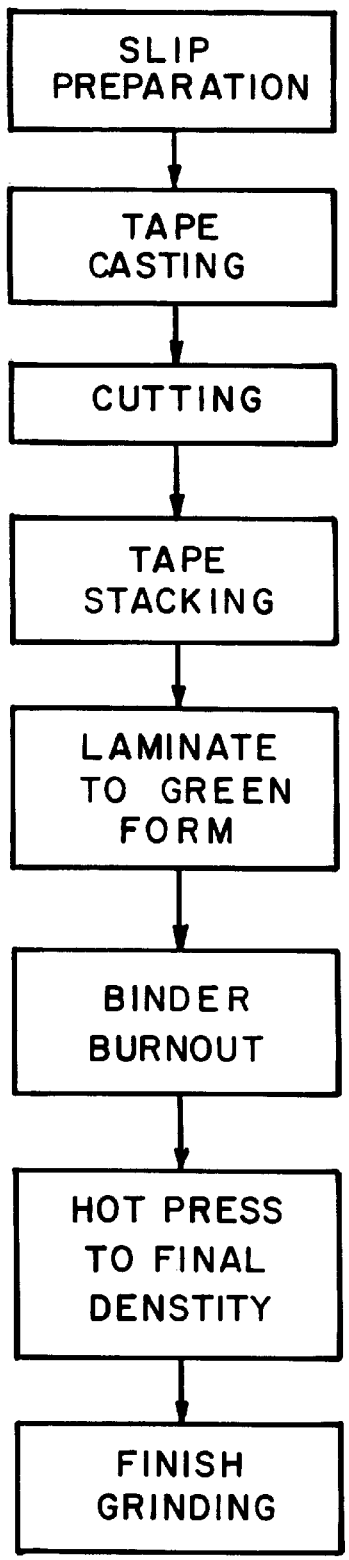
FIG. 12 is a flowchart for a first method of making a laminated ceramic cutting tool according to the present invention.
Figure 13:
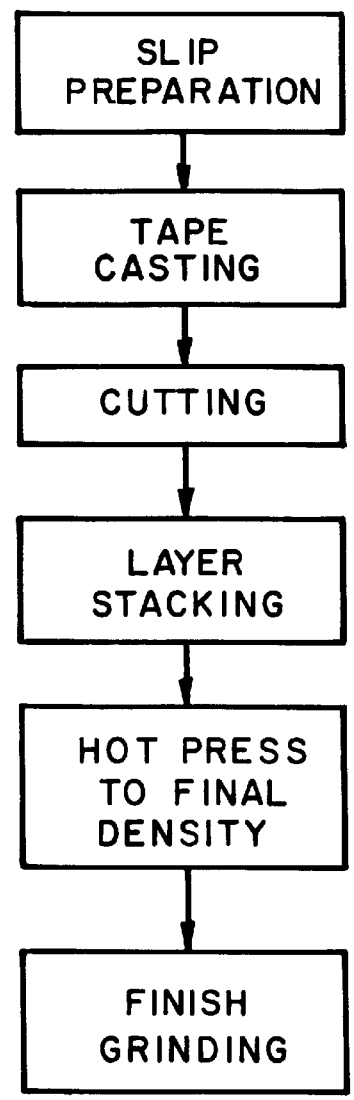
FIG. 13 is a flowchart for a second method of making a laminated ceramic cutting tool according to the present invention.

FIGS. 12 and 13 show flowcharts for two general methods according to the present invention. The determination as to which of the methods shown in FIGS. 12 and 13 is used depends on whether the core layer is greater than or less than 0.15 inch thick. When the core layer is greater than 0.15 inch thick, the method of FIG. 12 may be used, but the method indicated in FIG. 13 is preferred. Note that, when airborne, the whisker reinforcements may be harmful. Therefore, whiskers should be handled in slurry form during fabrication according to the following processes.

A typical processing sequence for the formation of ceramic tapes by the method indicated in FIG. 12 is set forth in Example 1 below.

Example 1

1. Slip Preparation

The solid ceramic constituents, aluminum oxide, SiC whiskers, $Si_3N_4$ whiskers, TiC whiskers, $Si_3N_4$ particles, TiN particles or TiC particles, are dried for 6–12 hours at 180° C. before mixing. Milling containers are half filled with ~95% alumina media, and the slip constituents are each weighed into the milling containers. The slip is then ball-milled for 24 hours. Before casting, the slip is allowed to sit idle for 15–30 minutes to allow entrapped gases to escape.

2. Tape Casting

Slip formulations are tape cast on a continuous tape caster. The slip is pumped directly from the milling jar into the reservoir located over the carrier film. The carrier film is continuously fed under the reservoir at a rate that can be varied from 20 to 480 in./min. A layer of slip is deposited onto the carrier film through an opening beneath the doctor blade. With a micro-meter adjustment, the doctor blade height can be varied from 0.004 to 0.02 inch. The carrier film and freshly cast tape are passed through a drying chamber and are rolled onto a spool in the center of the drying chamber. Monolithic and composite tapes are cast using a blade height of 0.015 inch at a rate of 80 in./min. and dried to a thickness of ~0.004 inch. A casting rate of 80 inches per minute and blade height of 0.015 inch produces uncracked tapes and allows the slurry level to be maintained in the slip reservoir.

3. Cutting

Squares of appropriate size are punched from the dried tape using a die cutter.

4. Tape Stacking

The carrier film is removed and the tapes stacked in a die for lamination. The tape layers are stacked so their casting directions are parallel. A layer of rubber is placed between the fixed lower ram of the die and the tape layers to improve lamination by distributing the load evenly over the laminate. Carrier film is placed on both sides of the laminate to prevent the surface layers from sticking to the die.

5. Laminate to Green Form

The die is placed between heated platens (60° C.) of a hydraulic press loaded to 3,000 psi for approximately 15 minutes.

6. Binder Burnout

The laminated tapes are heated in air at 10° C./min. to 225° C., then heated to 300° C. at 0.3° C./min. and held for 2 hours at that temperature before being heated to 550° C. at 2° C./min.

7. Hot Press to Final Density

Laminates are vacuum hot pressed in a Grafoil® lined or BN coated graphite die. The temperature is increased at 10° C./min. from room temperature to the hold temperature (1,650° C.), and the load of 4,500 psi is applied in a smooth ramp from the time the temperature reached 1,400° C. The maximum temperature and pressure are held for 1 hour. During cool-down the cooling rate is limited to 20° C./min. to 1,000° C., and the load is removed in a smooth ramp during the same period.

8. Finish Grinding

The consolidated laminates are removed from the hot pressing die and finish ground to final form.

For compositions in which the core layers are equal to or greater than 0.15 inch, a method according to the flowchart in FIG. 13 is preferred. Typical processing steps for the method according to FIG. 13 are set forth in Example 2 below.

Example 2

1. Slip Preparation

The solid ceramic constituents, aluminum oxide, SiC whiskers, $Si_3N_4$ whiskers, TiC whiskers, $Si_3N_4$ particles, TiN particles or TiC particles, are dried for 6–12 hours at 180° C. before mixing. Milling containers are half filled with ~95% alumina media and the slip constituents are each weighed into the milling containers. The slip is then ball-milled for 24 hours. Before casting, the slip is allowed to sit idle for 15–30 minutes to allow entrapped gases to escape.

2. Tape Casting

Slip formulations are tape cast on a continuous tape caster. The slip is pumped directly from the milling jar into the reservoir located over the carrier film. The carrier film is continuously fed under the reservoir at a rate that can be varied from 20 to 480 in./min. A layer of slip is deposited onto the carrier film through an opening beneath the doctor blade. With the micro-meter adjustment, the doctor blade height can be varied from 0.004 to 0.02 inch. The carrier film and freshly cast tape are passed through a drying chamber and are rolled onto a spool in the center of the drying chamber. Monolithic and composite tapes are cast using a blade height of 0.015 inch at a rate of 80 in./min. and dried to a thickness of ~0.004 inch. A casting rate of 80 inches per minute and blade height of 0.015 inch produces uncracked tapes and allows the slurry level to be maintained in the slip reservoir.

3. Cutting

Squares of appropriate size are punched from the dried tape using a die cutter.

4. Layer Stacking

The carrier film is removed, and the cast tapes that constitute the surface layers are stacked in a hot press die that has been pre-lined with BN powders or Grafoil® sheets. The tape layers are stacked so their casting directions are parallel. The dry powder form that constitutes the core layer is placed in the die on top of the tape-cast layers. The laminate is completed by placing the tape-cast layers on the opposite face to form a symmetric sandwich arrangement of the laminate.

5. Hot Press to Final Density

The pre-loaded laminate is vacuum hot pressed to final density. The temperature is increased at 10° C./min. from room temperature to the hold temperature (1,650° C.), and the load of 4,500 psi is applied in a smooth ramp from the time the temperature reached 1,400° C. The maximum temperature and pressure are held for 1 hour. During cooldown the cooling rate is limited to 20° C./min. to 1,000° C., and the load is removed in a smooth ramp during the same period.

6. Finish Grinding

The consolidated laminates are removed from the hot pressing die and finish ground to final form.

Thermoelastic Tailoring

Laminated ceramic cutting tools according to the present invention are designed with the object of meeting two basic goals. The first goal is to obtain maximum thermoelastically tailored surface compressive residual stresses with minimum core tensile residual stresses to improve strength, fracture toughness and thermal shock resistance. Note that tensile residual stresses may be acceptable in some applications, such as GX-06 and GX-08, discussed above, but a compressive (or at least neutral) compressive state is generally preferred. The second goal is to produce laminates with outer surfaces that minimize the chemical interaction between the cutting tool rake face and the workpiece. The second goal can be achieved by reducing the carbide content, for example, silicon carbide whiskers or titanium carbide particulates, in the rake face layer.

In order to achieve the first goal and to predict the residual stresses due to thermoelastic tailoring, the elastic modulus, Poisson's ratio, and the coefficient of thermal expansion of the individual lamina are needed. An empirical relation has been developed by Halpin and Tsai to estimate the longitudinal and transverse elastic modulus of short fiber isotropic laminates. These equations are discussed in detail in "Mechanical and Tribological Properties of Laminated Ceramic Cutting Tool Inserts", a thesis by Bruce A. Stutzman in partial fulfillment of requirements for the degree of Master of Science, The Pennsylvania State University, Department of Engineering Science and Mechanics, shelved Mar. 6, 1995, ("the Stutzman thesis"), incorporated by reference herein. (See pp. 14–19 of the Stutzman thesis.) The coefficient of thermal expansion for the lamina may be calculated using the Schapery equations, as discussed at p. 15 of the Stutzman thesis. Utilizing the thermoelastic properties of their ceramic constituents, the thermoelastic properties of individual lamina have been calculated and are set forth in Table VIII, below.

TABLE VIII

Lamina Properties Used to Calculate Laminate Properties

| Material | Elastic modulus (GPa) | Poisson's ratio | Shear modulus (GPa) | Coefficient of thermal expansion ($10^{-6}/°C$) |
|---|---|---|---|---|
| Alumina | 390 | 0.23 | 159 | 7.92 |
| 5 $SiC_w$/95 Alumina | 392 | 0.23 | 160 | 7.72 |
| 10 $SiC_w$/90 Alumina | 395 | 0.22 | 161 | 7.54 |
| 20 $SiC_w$/80 Alumina | 400 | 0.22 | 165 | 7.16 |
| 26 TiC/74 Alumina | 395 | 0.22 | 162 | 8.10 |

According to the invention, laminate design is performed using modified laminate plate theory to predict the residual stresses created as a result of the cooling of the laminates from the processing temperature. An assumption is made that the residual stresses do not begin to form until the cooling temperature reaches 1,832° F., to allow for plastic relaxation of the stresses which may occur at the higher temperatures. This assumption may affect the absolute magnitude of the stresses, but the relative stresses between lamina should be correct. Generally, one can predict that the outer layers will have a compressive residual stress if the coefficient of thermal expansion in the outer layers is lower than the core layer. With such a differential, the outer layers will generally cool more quickly than the core layer after hot pressing, thereby imparting the compressive residual stresses. Laminate designs and their predicted biaxial residual stress patterns are given in Tables I–VI, above. Laminate designs GX-20, DX-13 and DX-14 incorporate residual surface compressive stresses to improve their strength, fracture toughness and thermal shock resistance. Laminate designs GX-06 and GX-08 incorporate residual tensile stresses, but the rake face consists of alumina in these designs for increased chemical resistance. Additionally, laminate designs DX-13 and DX-14 have a decreased amount of silicon carbide whiskers in the rake face for improved chemical resistance. Laminate design DX-14 incorporates seven layers instead of five to reduce the stress difference between layers, and consequently reduce the shear stress between lamina.

Thermoelastic properties of laminate materials used for laminate properties calculations may also be obtained from the manufacturer of the material, when available. For composites where such data are not available, the properties of the lamina may be calculated using the Halpin-Tsai method.

Laminate designs should be selected to avoid large tensile stresses within the lamina and large differences in stresses between lamina, to minimize delamination.

In practice, residual stresses are first calculated, and then specimens may be tested to verify the calculations. A typical test in this regard is set forth in Example 3, below.

Example 3

The cutting tool according to design DX-14 was machined into four test bars 4.76 mm×6.35 mm×50.8 mm for material property characterization. The four test bars were ground and the edges chamfered to 0.762 mm. The corners were finished to 0.0635 mm radius to minimize the stress concentrations. The remaining plate was machined into cutting tool specimens 1.27 mm×12.7 mm×4.76 mm. The density of the DX-14 specimens was measured using Archimedes' principle with water as the liquid medium. The measured value of 3.88 g/cc was within 2% of the expected density for fully solid material. A four-point bend test with a major span of 31.7 mm, minor span of 15.875 mm, and loading rate of 0.51 in/min was used to measure the modulus of rupture (MOR) of the DX-14 material. The elastic modulus of this material was measured using a dynamic resonance technique. The elastic moduli and MOR values for an average of four tests were 380 GPa and 577 MPa, respectively.

The elastic modulus results are within 2% of the rule-of-mixtures (ROM) calculations. The strength of the DX-14 laminate is about 8% greater than would be expected for monolithic silicon carbide whisker-reinforced alumina. Density measurements on the DX-14 material indicate at least 98% of theoretical density was obtained during fabrication of this specimen. This indicates that the hot pressing parameters are sufficient for complete densification. The agreement between elastic modulus measurements and ROM predictions indicates that good bonding between fiber reinforcement and matrix was achieved.

Performance Data

Wear performance tests were conducted on samples of the GX-06, GX-08, GX-20, DX-13 and DX-14 designs, as described in Amateau et al., "Performance of Laminated Ceramic Composite Cutting Tools", *Ceramics International*, Vol. 21, pp. 317–323 (1995), incorporated herein by reference. Several prior art designs, designated RDC-3905, SX-5 and WG-300, were also tested. The prior art designs were generally in the nature of monolithic reinforced ceramic materials.

Four separate cutting operations were performed on a 718 nickel-based superalloy billet. The first operation removed approximately 4 mm of material from a 159 mm diameter billet. The second cutting operation removed 2.0 mm of material from the remaining 152 mm diameter billet using unused tools of the same composition as in the first cutting operation. The third cutting operation removed 6 mm from the 141 mm diameter billet with a new WG-300 cutting tool. The last cutting operation removed 2.0 mm from a 133 mm diameter billet using new SX-5, DX-14 and RD-3905 cutting tools. Flank wear in the nose region and in the depth of cut region were measured and are referred to as nose wear and notch wear, respectively. The average wear rates measured after the first cutting operation are given in Table IX, below.

TABLE IX

Wear Rates for Cutting Tool Materials Against 718 Nickel-Based Superalloy

| Tool material | Average wear rate for nose wear (mm/min) | Average wear rate for notch wear (mm/min) |
|---|---|---|
| RDC-3905 | 0.178 | 0.051 |
| SX-5 | 0.117 | 0.127 |
| DX-14 | 0.053 | 0.127 |
| WG-300 | 0.046 | 0.300 |

It is clear that the combined average nose wear and notch wear rates for laminated design DX-14, according to the present invention, is substantially less than the combined average nose wear and notch wear rates for the monolithic designs of the prior art. Note that the prior art reinforced ceramic whisker composite tool, WG-300, had the poorest average notch wear rate of the four tools tested.

The nose wear for both DX-14 and WG-300 was low compared to SX-5 and RD-3905 for the second through fourth cutting operations.

Additional testing, results and conclusions are discussed in the Amateau et al. paper, incorporated by reference above, *Ceramics International*, Vol. 21, pp. 320–322.

To summarize, the method and composition of the present invention provides new and unobvious compositions and arrangement of laminate layers in a reinforced laminated ceramic cutting tool to counteract the principal cutting tool failure mechanisms. Tape casting is advantageously used to control the thickness and orientation of the reinforcements in the various layers of the cutting tool. Tape cast unreinforced oxide layers may be utilized on the rake face of the cutting tool to minimize crater wear by chemical reaction with the metal chip. Whiskers and platelets, when used as reinforcements, are advantageously oriented in an oxide ceramic matrix to minimize flank wear and to maximize toughness. Thermoelastic tailoring provides favorable residual stress patterns in the cutting tool. Finally, combining tape casting with dry powder layers produces favorable results while lowering fabrication costs.

Having described the presently preferred embodiments of the invention, it will be understood by those of ordinary skill in the art that variations of the methods and compositions discussed herein may be utilized without departing from the spirit and scope of the present invention. Therefore, it is only intended to limit the invention by the following claims.

What is claimed is:

1. In a laminated ceramic cutting tool having a flank face, the improvement comprising:
   a core layer;
   at least two outer layers symmetrically arranged about said core layer and spaced along an axis which is perpendicular to said core layer; and
   a reinforcement selected from one or more of the group consisting of reinforcement particles, reinforcement whiskers oriented so that a longitudinal dimension of substantially all of said whiskers is aligned substantially perpendicular to said flank face and reinforcement platelets oriented so that a basal plane of substantially all ot said platelets is in a plane substantially perpendicular to said flank face;
   said reinforcement present in said cutting tool in an arrangement selected from the group consisting of said core layer, said core layer and said at least two outer layers, and said at least two outer layers;
   each outer layer having a first compressive residual stress in a direction perpendicular to said flank face and a second compressive residual stress in a direction parallel to said flank face;
   said at least two outer layers having the same thickness, composition, and residual stresses; and
   the composition of said outer layers being different from a composition of said core layer.

2. The laminated ceramic cutting tool of claim 1 wherein said reinforcement constitutes about 2% to about 45% by volume of the layer in which the reinforcement is present.

3. The laminated ceramic cutting tool of claim 1 wherein each of said core layer and said outer layers is made by tape casting.

4. The laminated ceramic cutting tool of claim 1 wherein said core layer is not made by tape casting.

5. The laminated ceramic cutting tool of claim 1 wherein the composition of said core layer comprises one or more of the group consisting of alumina, silicon carbide, silicon nitride, titanium carbide, titanium nitride, cemented tungsten carbide and boron carbide.

6. The laminated ceramic cutting tool of claim 1 wherein the composition of said reinforcement comprises one or more of the group consisting of silicon carbide, titanium carbide, silicon nitride and titanium nitride.

7. The laminated ceramic cutting tool of claim 1 wherein said core layer has a thickness within a range of from about 0.1375 inch to about 0.1675 inch.

8. The laminated ceramic cutting tool of claim 1 wherein each of said outer layers has a thickness within a range of from about 0.0050 inch to about 0.0250 inch.

9. The laminated ceramic cutting tool of claim 1 wherein the composition of said outer layers comprises alumina.

10. The laminated ceramic cutting tool of claim 1 wherein the coefficient of thermal expansion for said core layer is about $7.92 \times 10^{-6}/°$ C. and the coefficient of thermal expansion of each of said outer layers is in a range of from about $7.16 \times 10^{-6}/°$ C. to about $8.10 \times 10^{-6}/°$ C.

11. The laminated ceramic cutting tool of claim 1 wherein the absolute value of said residual stress in each of said outer layers, in a direction perpendicular to said flank face, is in a range of from about 3,900 psi to about 39,200 psi.

12. The laminated ceramic cutting tool of claim 1 wherein the absolute value of said residual stress in each of said outer layers, in a direction parallel to said flank face, is in a range of from about 1,741 psi to about 38,736 psi.

13. The laminated ceramic cutting tool of claim 1 further including an unreinforced layer on an outward side of each of said outer layers, said unreinforced layer selected from the group consisting of alumina and mullite.

14. The laminated ceramic cutting tool of claim 1 wherein said reinforcement is arranged to be present in said outer layers, said outer layers further including a matrix, said matrix having a composition which comprises one or more of the group consisting of alumina, cemented tungsten carbide, boron carbide, titanium carbide, silicon carbide, titanium nitride and silicon nitride.

15. The laminated ceramic cutting tool of claim 1, wherein the coefficient of thermal expansion of each of said outer layers is lower than the coefficient of thermal expansion of said core layer.

16. In a laminated ceramic cutting tool having a flank face, the improvement comprising:
   a core layer having a thickness within a range of from about 0.1375 inch to about 0.1675 inch and whose composition comprises one or more of the group consisting of alumina, silicon carbide, silicon nitride, titanium carbide, titanium nitride, cemented tungsten carbide and boron carbide;

at least two outer layers, one on each side of said core layer, each of said outer layers having a thickness within a range of from about 0.0050 inch to about 0.0250 inch;

each of said outer layers having a composition different from said core layer and which comprises one or more of the group consisting of alumina, cemented tungsten carbide, boron carbide, titanium carbide, silicon carbide, titanium nitride and silicon nitride;

said outer layers including a reinforcement selected from one or more of the group consisting of reinforcement particles, reinforcement whiskers oriented so that a longitudinal dimension of substantially all of said whiskers is aligned substantially perpendicular to said flank face and reinforcement platelets oriented so that a basal plane of substantially all of said platelets is in a plane substantially perpendicular to said flank face;

said reinforcement having a composition which comprises one or more of the group consisting of silicon carbide, silicon nitride, titanium carbide and titanium nitride;

each of said at least two outer layers having the same thickness and composition; and each of said at least two outer layers having a compressive residual stress state relative to said core layer.

17. The laminated ceramic cutting tool of claim 16 further including a reinforcement in said core layer.

18. The laminated ceramic cutting tool of claim 16 further including an unreinforced layer positioned outwardly of each of said at least two outer layers, said unreinforced layer selected from the group consisting of alumina and mullite.

19. The laminated ceramic cutting tool of claim 16 wherein each of said at least two outer layers is made by tape casting.

20. In a laminated ceramic cutting tool having a flank face, the improvement comprising:

a core layer having a thickness within a range of from about 0.1375 inch to about 0.1675 inch and whose composition comprises one or more of the group consisting of alumina, silicon carbide, silicon nitride, titanium carbide, titanium nitride, cemented tungsten carbide and boron carbide;

at least two outer layers, one on each side of said core layer, each of said outer layers having a thickness within a range of from about 0.0050 inch to about 0.0250 inch;

each of said at least two outer layers having a composition different from said core layer and which comprises one or more of the group consisting of alumina, cemented tungsten carbide, boron carbide, titanium carbide, silicon carbide, titanium nitride and silicon nitride;

said core layer including a reinforcement selected from one or more of the group consisting of reinforcement particles, reinforcement whiskers oriented so that a longitudinal dimension of substantially all of said whiskers is aligned substantially perpendicular to said flank face and reinforcement platelets oriented so that a basal plane of substantially all of said platelets is in a plane substantially perpendicular to said flank face;

said reinforcement having a composition which comprises one or more of the group consisting of silicon carbide, silicon nitride, titanium carbide and titanium nitride;

each of said at least two outer layers having the same thickness and composition; and each of said at least two outer layers having a compressive residual stress state relative to said core layer.

21. A reinforced, laminated ceramic cutting tool having a flank face, said cutting tool further comprising:

a core layer;

at least two outer layers symmetrically arranged about said core layer and spaced along an axis which is perpendicular to said core layer; and a reinforcement selected from one or more of the group consisting of reinforcement particles, reinforcement whiskers oriented so that a longitudinal dimension of substantially all of said whiskers is aligned substantially perpendicular to said flank face and reinforcement platelets oriented so that a basal plane of substantially all of said platelets is in a plane substantially perpendicular to said flank face;

said reinforcement present in said cutting tool in an arrangement selected from the group consisting of said core layer, said core layer and said at least two outer layers, and said at least two outer layers;

each outer layer having a first residual stress in a direction perpendicular to said flank face and a second residual stress in a direction parallel to said flank face;

said at least two outer layers having the same thickness, composition, and residual stresses;

wherein the coefficient of thermal expansion for said core layer is about $7.92 \times 10^{-6}/°$ C. and the coefficient of thermal expansion of each of said outer layers is in a range of from about $7.16 \times 10^{-6}/°$ C. to about $8.10 \times 10^{-6}/°$ C.

22. A reinforced, laminated ceramic cutting tool having a flank face, said cutting tool further comprising:

a core layer;

at least two outer layers symmetrically arranged about said core layer and spaced along an axis which is perpendicular to said core layer; and a reinforcement selected from one or more of the group consisting of reinforcement particles, reinforcement whiskers oriented so that a longitudinal dimension of substantially all of said whiskers is aligned substantially perpendicular to said flank face and reinforcement platelets oriented so that a basal plane of substantially all of said platelets is in a plane substantially perpendicular to said flank face;

said reinforcement present in said cutting tool in an arrangement selected from the group consisting of said core layer, said core layer and said at least two outer layers, and said at least two outer layers;

each outer layer having a first residual stress in a direction perpendicular to said flank face and a second residual stress in a direction parallel to said flank face;

said at least two outer layers having the same thickness, composition, and residual stresses; and an unreinforced layer on an outward side of each of said outer layers, said unreinforced layer selected from the group consisting of alumina and mullite.

23. A reinforced, laminated ceramic cutting tool having a flank face, said cutting tool further comprising:

a core layer;

at least two outer layers symmetrically arranged about said core layer and spaced along an axis which is perpendicular to said core layer; and a reinforcement selected from one or more of the group consisting of reinforcement particles, reinforcement whiskers oriented so that a longitudinal dimension of substantially all of said whiskers is aligned substantially perpendicular to said flank face and reinforcement platelets oriented so that a basal plane of substantially all of said platelets is in a plane substantially perpendicular to said flank face;

said reinforcement present in said cutting tool in an arrangement selected from the group consisting of said core layer, said core layer and said at least two outer layers, and said at least two outer layers;

each outer layer having a first residual stress in a direction perpendicular to said flank face and a second residual stress in a direction parallel to said flank face;

said at least two outer layers having the same thickness, composition, and residual stresses;

wherein the coefficient of thermal expansion of each of said outer layers is lower than the coefficient of thermal expansion of said core layer.

24. A reinforced, laminated ceramic cutting tool having a flank face, said cutting tool further comprising:

a core layer having a thickness within a range of from about 0.1375 inch to about 0.1675 inch and whose composition comprises one or more of the group consisting of alumina, silicon carbide, silicon nitride, titanium carbide, titanium nitride, cemented tungsten carbide and boron carbide;

at least two outer layers, one on each side of said core layer, each of said outer layers having a thickness within a range of from about 0.0050 inch to about 0.0250 inch;

each of said outer layers having a composition which comprises one or more of the group consisting of alumina, cemented tungsten carbide, boron carbide, titanium carbide, silicon carbide, titanium nitride and silicon nitride;

said outer layers including a reinforcement selected from one or more of the group consisting of reinforcement particles, reinforcement whiskers oriented so that a longitudinal dimension of substantially all of said whiskers is aligned substantially perpendicular to said flank face and reinforcement platelets oriented so that a basal plane of substantially all of said platelets is in a plane substantially perpendicular to said flank face;

said reinforcement having a composition which comprises one or more of the group consisting of silicon carbide, silicon nitride, titanium carbide and titanium nitride;

each of said at least two outer layers having the same thickness and composition;

each of said at least two outer layers having a compressive residual stress state or a neutral residual stress state, relative to said core layer; and an unreinforced layer positioned outwardly of each of said at least two outer layers, said unreinforced layer selected from the group consisting of alumina and mullite.

25. A laminated ceramic cutting tool made according to a process comprising the steps of:

(a) preparing a slurry comprising a matrix powder and a reinforcement;

(b) depositing the slurry on a carrier film using a spreading blade to form a tape, said carrier film moving relative to said spreading blade in a casting direction;

(c) drying the tape;

(d) cutting the tape into sections of predetermined shape and dimensions;

(e) removing the carrier film from the tape;

(f) stacking a first portion of said tape sections in a die so that a casting direction for each section is parallel to the casting direction of its adjacent sections;

(g) inserting a dry powder in said die on top of said first portion of said tape sections and inserting a second portion of said tape sections, equal to said first portion, into said die on top of said dry powder to form a symmetric sandwich arrangement; and h) pressing said tape sections and said dry powder in said die under conditions of elevated temperature and pressure.

* * * * *